United States Patent
Contractor

(10) Patent No.: US 7,099,312 B1
(45) Date of Patent: Aug. 29, 2006

(54) SYSTEM AND METHOD FOR DELIVERING PERSONALIZED MESSAGES TO SELECTED CALLING PARTIES

(75) Inventor: Sunil H. Contractor, Marietta, GA (US)

(73) Assignee: BellSouth Intellectual Property Corporation, Wilmington, DE (US)

( * ) Notice: Subject to any disclaimer, the term of this patent is extended or adjusted under 35 U.S.C. 154(b) by 1128 days.

(21) Appl. No.: 09/884,404

(22) Filed: Jun. 19, 2001

(51) Int. Cl.
*H04L 12/50* (2006.01)

(52) U.S. Cl. .................... 370/357; 379/88.17

(58) Field of Classification Search ............... 370/357, 370/352, 356, 385, 328, 329; 455/435.1, 455/445; 379/211.02
See application file for complete search history.

(56) References Cited

U.S. PATENT DOCUMENTS

| | | | |
|---|---|---|---|
| 5,276,731 A | 1/1994 | Arbel et al. | |
| 5,509,062 A | 4/1996 | Carlsen | |
| 5,615,253 A * | 3/1997 | Kocan et al. | 379/196 |
| 5,701,301 A | 12/1997 | Weisser, Jr. | 370/428 |
| 5,963,864 A | 10/1999 | O'Neil et al. | |
| 5,974,133 A * | 10/1999 | Fleischer et al. | 379/230 |
| 6,041,114 A | 3/2000 | Chestnut | |
| 6,044,403 A * | 3/2000 | Gerszberg et al. | 709/225 |
| 6,125,126 A | 9/2000 | Hallenst.ang.l | |
| 6,130,938 A | 10/2000 | Erb | |
| 6,587,867 B1 * | 7/2003 | Miller et al. | 709/200 |
| 6,625,437 B1 * | 9/2003 | Jampolsky et al. | 455/405 |
| 6,630,883 B1 * | 10/2003 | Amin et al. | 340/7.29 |
| 6,665,390 B1 * | 12/2003 | Ekstrom | 379/201.01 |
| 6,718,026 B1 | 4/2004 | Pershan et al. | |
| 6,804,334 B1 * | 10/2004 | Beasley et al. | 379/88.17 |
| 6,823,057 B1 * | 11/2004 | Pershan et al. | 379/211.02 |
| 6,937,713 B1 * | 8/2005 | Kung et al. | 379/211.02 |
| 2002/0077820 A1 * | 6/2002 | Simpson | 704/260 |
| 2003/0207689 A1 * | 11/2003 | Roberts et al. | 455/445 |

* cited by examiner

*Primary Examiner*—Brian D. Nguyen
(74) *Attorney, Agent, or Firm*—Lee & Hayes, PLLC

(57) ABSTRACT

A forwarding telephone number in a programmable telephone number list associated with a called number is dialed in response to a busy or no answer signal at the called number. The programmable telephone number table may include preferred caller telephone numbers. The system and method may be may be implemented on an AIN based wire line system.

9 Claims, 4 Drawing Sheets

SYSTEM AND METHOD FOR DELIVERING PERSONALIZED MESSAGES TO SELECTED CALLING PARTIES

FIELD OF THE INVENTION

The present invention generally relates to the field of telecommunications and to systems and methods for managing telephony-based services. More particularly, the present invention relates to forwarding calls from selected parties to another number if the call is not answered or the originally dialed number is busy.

BACKGROUND OF THE INVENTION

While some homes and small businesses having multiple wire line telephone numbers, the majority of homes and small businesses today still have only a single wire line. With the advent of and drastic increase in the popularity of the Internet this has led to a number of problems at single line subscriber locations. For instance, while broadband access technologies are becoming increasingly prevalent the majority of homes and small businesses today still rely on dial-up Internet access over the public switched telephone network (PSTN). As a result, many calls are missed or directed to voice mail during dial-up Internet access sessions from single line homes or businesses because subscribers typically do not have the option of terminating the access session in favor of receiving the incoming telephone call. Many people today do however own and carry wireless telephones. Thus, it would be advantageous for a party with a single wire line number who regularly accesses the Internet over a dial-up access session to have the ability to forward calls received on the wire line during the access session to his or her wireless telephone.

SUMMARY OF THE PRESENT INVENTION

The present invention is directed to systems and methods for forwarding telephone calls received on a wire line telephone that is busy or not answered to another telephone number such as a wireless telephone number. Preferably, the invention is implemented using an Advanced Intelligent Network (AIN) wire line telephone system.

According to aspects of the present invention, a database or other memory storage device is provided to a subscriber (i.e., a telephone user subscribing to an embodiment of the present invention, e.g., the calling party) for storing a programmable telephone number table containing the subscriber's wire line number and the subscriber's wireless telephone number (or number of another line where he or she may be reached). The programmable table may also contain a list of preferred calling parties' telephone numbers, the invention forwarding only calls received from the preferred parties. The subscriber may add, modify, or delete the telephone numbers in the telephone number table. The subscriber may access the telephone number table any number of ways including, but not limited to, through a telephone keypad, an Internet website, and the like.

According to further aspects of the present invention, the system may provide a prompt and/or indication that that the system is dialing the subscriber's forwarding telephone number. Preferably, the indication is audible voice notification. Alternatively, the indication may be through audible tones, a lamp, or through other indicators.

According to an aspect of the invention, the system may determine the on/off status of a wireless number before dialing the wireless number. If the wireless number does not have an on-status, the system does not call that wireless number.

According to other aspects of the invention, a subscriber list is provided including a list of subscribers with their associated passwords and/or personal identification numbers (PIN).

The above-listed features of the present invention will be more fully set forth hereinafter.

BRIEF DESCRIPTION OF THE DRAWINGS

The present invention is further described in the detailed description that follows, by reference to the noted drawings by way of non-limiting examples of preferred embodiments of the present invention, in which like references numerals represent similar parts throughout the several views of the drawings, and wherein.

DETAILED DESCRIPTION OF THE PREFERRED EMBODIMENTS

The present invention is directed to forwarding a wire line call to an alternate number where the subscriber may be reached in response to a busy or no answer signal on the wire line. The alternate number may be a wireless telephone number. The system also may determine the on/off status of a wireless phone and only dial the wireless number if the wireless phone has on on-status. The system further may provide prompts and indication when dialing the alternate telephone number prior to, or concurrent with the alternate number being dialed. The invention is also directed to a programmable telephone number table including telephone number lists, which may be modified by a subscriber. The present invention may be implemented on an Advanced Intelligent Network (AIN) based wire line telephone system.

AIN Overview

An AIN is a particular type of telephone system with intelligent devices that handle the messaging and routing of calls. In addition, these intelligent devices may also provide enhanced features. These intelligent devices were first developed and implemented in late 1970's and early 1980's to address the inefficiencies of the then existing telephone system.

In a wire line telephone system with AIN capabilities, intelligent devices are included in the telephone system to perform messaging and routing. Additionally, because these intelligent devices are programmable, they provide the ability for enhanced features. These intelligent devices are interconnected to the COs and are described more fully in U.S. Pat. No. 5,701,301, which is incorporated herein by reference in its entirety. In an AIN wire line telephone system, COs are replaced with service switching point (SSP) central offices, which are central offices that include intelligent network functionality, for allowing the central offices to communicate with the intelligent devices.

Figure 1:
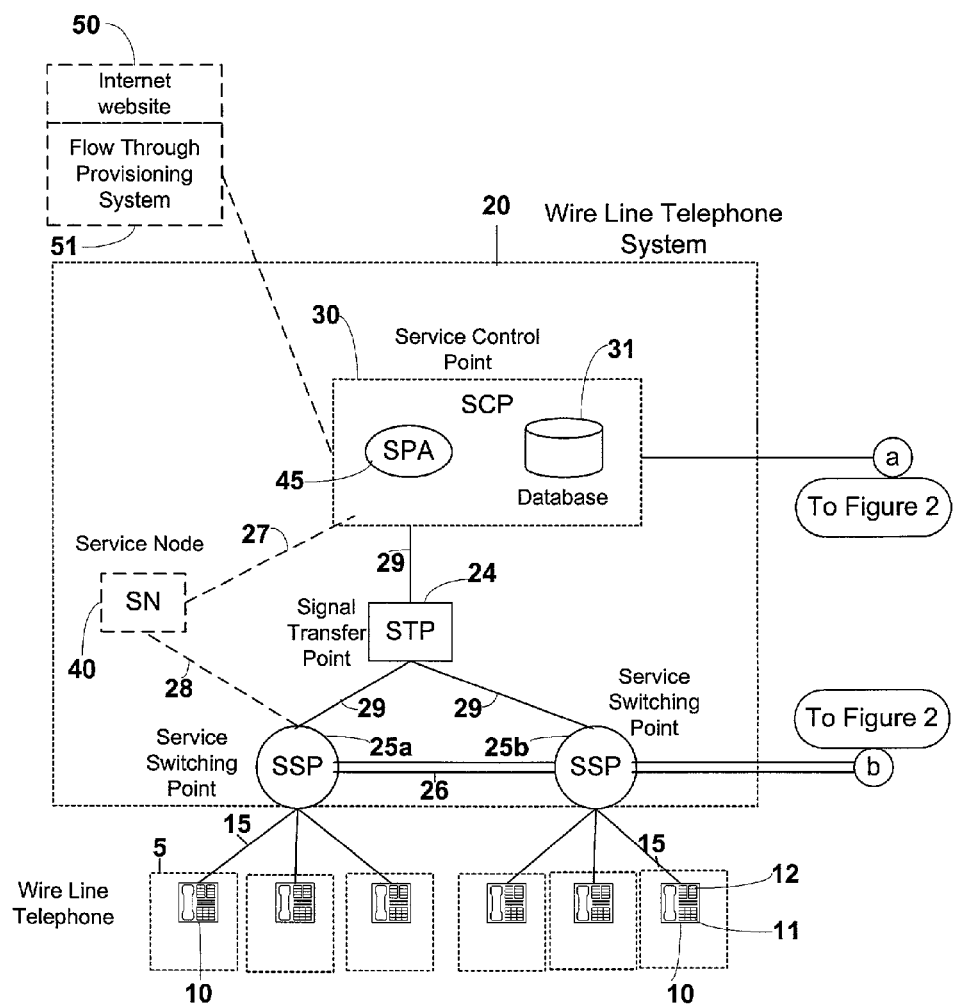
FIG. 1 is a general block diagram of an exemplary Advanced Intelligent Network (AIN) based wire line system for implementing intelligent network management features, in accordance with the present invention.

FIG. 1 is a general block diagram of an exemplary AIN based wire line system for implementing intelligent network management features in accordance with the present invention. As shown in FIG. 1, an AIN wire line telephone system 20 includes at least one service control point (SCP) 30, at least one signal transfer point (STP) 24, at least one service switching point central office (SSP), shown as 25a, 25b (commonly referred to hereinafter as 25), and a plurality of subscriber locations 5. Optionally, the wire line telephone system 20 may include at least one service node (SN) 40.

Subscriber locations 5 include terminating equipment, which may be a wire line telephone 10. Although wire line telephones 10 are illustrated as the pieces of terminating equipment in FIG. 1, those skilled in the art will understand that such pieces include other telecommunication devices such as facsimile machines, computers, modems, etc. Wire line telephones 10 may include a telephone keypad 11 and indicating lamps 12. Subscriber locations 5 are connected to an SSP 25 via telephone lines 15 (e.g., plain old telephone service (POTS), or similar). A telephone line 15 may also be referred to as a calling line and the terms will be used interchangeably hereinafter. Each SSP 25 serves a designated group of calling lines, and thus, the SSP 25 that serves a particular calling line may be referred to as its serving switch or local SSP 25. Alternatively, subscriber locations 5 may be connected to a private branch exchange (not shown), before connecting to an SSP 25.

Each active calling line in North America is assigned a ten digit calling line number. The term "calling line number" is used in its generally understood meaning to be the number which is dialed or input into the telephone keypad 11 by a calling party or source to reach a piece of terminating equipment on a calling line associated with the dialed calling line number. A calling line number is commonly referred to as a telephone number or a directory number and these terms will be used interchangeably herein. A calling line number associated with wire line telephone system 20 is referred to herein as a wire line number. A calling line number associated with a wireless telephone system (for example, wireless telephone system 100 described below with respect to FIG. 2) is referred to herein as a wireless number.

A party making a telephone call is referred to as the calling party and the party intended to be reached is referred to as the called party. The calling line number of the calling party is the calling number. The calling line number of the called party is the called number. In a typical application, when a calling party dials a called number, the SSP 25 of the calling number (e.g., the calling or originating SSP 25a), connects to the SSP 25 (e.g., the called or terminating SSP 25b) of the called number, over trunk lines 26. The SSP 25b rings the wire line telephone 10 of the called number.

A telephone call may result in several statuses. A busy status occurs when the called party's line is busy. For example, the called party may currently be using the telephone. A no-answer status occurs when there is no answer on the called party's line. For example, the called party may not be near the telephone 10 to answer. Also, in a wireless telephone system 100 the called party may not answer the telephone 110 or the telephone 110 may be turned off. An answer status occurs when the calling party answers the telephone, for example, by taking the telephone 10 off-hook in response to receiving a telephone call. The predetermined time is a programmable time. If however, an answering machine or voice messaging system answers a call, an answer status will be triggered.

The SSPs 25 are each programmable switches which recognize AIN-type calls, launch queries to intelligent devices in the AIN, receive commands and data from the intelligent devices with the AIN 30 to further process and route calls, and can be configured with triggers (more fully described below) to initiate AIN actions.

SSPs 25 are also connected to an element referred to as an STP 24 via respective data links 29. Currently, these data links 29 employ a signaling protocol referred to as Signaling System 7 (SS7), which is well known to those skilled in the art and described in a specification promulgated by the American National Standards Institute (ANSI). The SS7 protocol is a layered protocol, which employs data packets, synonymously referred to as packets, information packets, message packets, or messages. A data packet includes a beginning header, an ending header, and error checking bits.

STPs 24 perform messaging and routing functions between the SSPs 25 and the SCP 30 on an AIN network. Each SSP 25 is directly connected to an STP 24, which is its local STP 24. Each STP 24 may be connected to several SSPs 25. If an SSP 25 sends a message to another intelligent device on the AIN, the SSP 25 will first send the message to its local STP 24. STP 24 will read the message and determine where to route the message. Typically, the STP 24 will send the message to the SCP 30. The SCP 30 will then process the message and send a reply message to the appropriate STP 24. The STP 24 will then route the reply message and send that reply message to the appropriate SSP 25.

Much of the intelligence of the AIN resides in SCP 30, which includes a database 31, and is connected to STP 24 over data link 29. Typically, the SCP 30 is also the repository of service package applications (SPA) 45 that are used in connection with or as part of the database 31 in the application of telecommunication services or enhanced features to calling lines. SPAs 45 reside on SCP 30 and provide the programmable device with intelligence to process calls and queries sent from SSPs 25 and other AIN devices. An SCP 30 receives messages from elements within the wire line telephone network 20, processes the messages according to logic of appropriate SPA 45, and returns a reply message to the appropriate element in the network 20. The messages may include routing requests and/or enhanced features. An example of an enhanced feature available from a SPA 45 is caller identification. In caller identification, the called party receives the identification (e.g., the calling party name) of the calling party along with the calling party number. A telephone user may subscribe to an enhanced feature available in the AIN. A telephone user subscribing to an embodiment of the present invention is referred to as a subscriber.

The AIN may also include an SN 40, which is an interactive data system that may act as a switch to transfer calls, recognize telephone keypad inputs and voice commands, provide voice synthesis, and/or store messages. SN 40 includes both voice and dual tone multi-frequency (DTMF) signal recognition devices and voice synthesis devices and therefore can respond to both voice commands and telephone keypad 11 commands. In addition, SN 40 may include a data assembly interface and a data storage device. The data storage device may be used to store audio messages. The SN 40 may provide interactive help, collect voice information from subscribers in a call, track calls, and provide indication, announcement, and messaging functions.

SN 40 is connected to the SCP 30 over data line 27. This connection is typically accomplished with X.25, TCP/IP, and like protocols. In addition, SN 40 typically is connected to one or more SSPs 25 via Integrated Service Digital Network (ISDN) data links as shown by the data link 28 between SSP 25*a* and SN 40.

In order to keep the processing of data and calls as simple as possible, a relatively small set of triggers may be defined for each SSP 25. Specific triggers may also be defined for each calling line number. A trigger is an event that generates a message to be sent to a device within the AIN. For example, the trigger may cause the SSP 25 to send a query message to the SCP 30 requesting instructions. SCP 30 may then query its database 31 for processing instructions with respect to a particular call. The results of the database inquiry are sent back to the SSP 25 in a response from the SCP 30 through STP 24. The return message may include call processing instructions to the SSP 25. The instructions may command the SSP 25 to take some special action as a result of a customized calling service or enhanced feature, for example, forwarding a call to a voice messaging system. In response, the SSP 25 may move through its call states, collect telephone keypad inputs, generates further messages, or route calls necessary to complete the command issued by the SCP 30.

Various triggers can by configured for each calling line number or for each SSP 25. Triggers may be configured to affect either the calling party or the called party, or both. For example, an Off-hook Immediate Trigger may be set on the calling number. If this trigger is set, the SSP 25 initiates a query to the SCP 30 every time that calling number line is taken off-hook. Alternatively, a trigger may be set on the called line number which will trigger an AIN message to be sent. One skilled in the art of AIN applications will understand the various triggers available in a particular AIN system.

An Internet website 50 or other remote data store or network may be connected to the wire line telephone system 20 via a flow through provisioning system 51. The Internet is a vast network of interconnected computers communicating over a collection of networks, including Arpanet, NSFnet, regional networks such as NYsernet, local networks at a number of university and research institutions, and a number of military networks. The protocols generally referred to as TCP/IP were originally developed for use through Arpanet and have subsequently become widely used in the industry. The protocols provide a set of services that permit users to communicate with each other across the entire Internet. The specific services that these protocols provide include file transfer, remote log-in, remote execution, remote printing, computer mail, and access to network file systems. A flow through provisioning system 51 may be used to pass the data from the Internet to the SCP 30. In this manner, a user may access an Internet website through any conventional method, for example, dial up through a modem, which can in turn communicate with the wire line telephone system 20.

Wireless Overview

Figure 2:
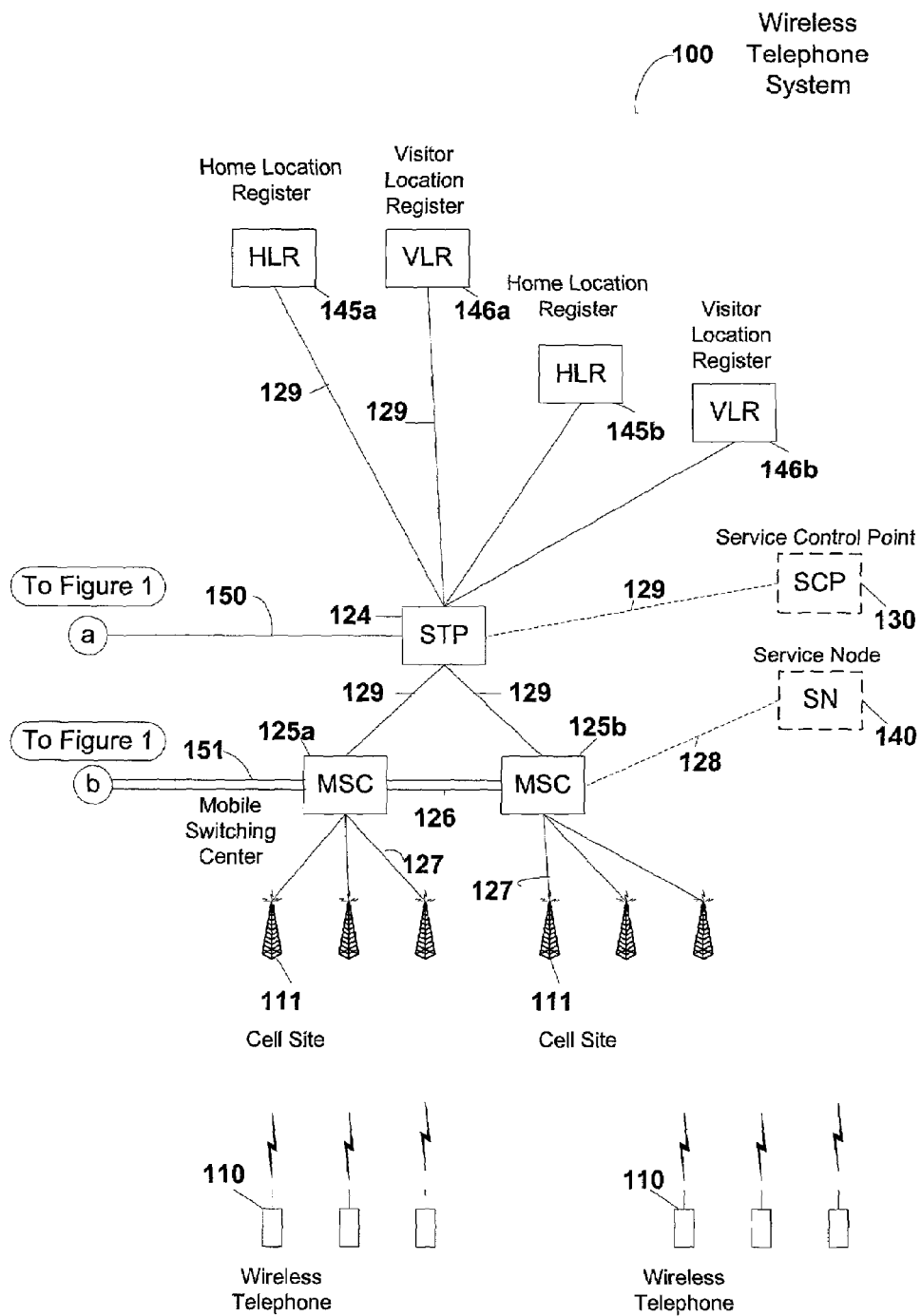
FIG. 2 is a general block diagram of an exemplary wireless telephone system for implementing intelligent network management features, in accordance with the present invention.

FIG. 2 illustrates, in a general block diagram form, a wireless telephone system 100 for implementing intelligent network management features, in accordance with the present invention. As shown in FIG. 2, a wireless telephone system 100 includes a plurality of wireless phones 110, a plurality of cell sites 111, at least one mobile switching center (MSC) shown as 125*a* and 125*b* (commonly referred to as 125), a plurality of home location registers (HLR) shown as 145*a* and 145*b* (commonly referred to as 145), and a plurality of visitor location registers (VLR) shown as 146*a* and 146*b* (commonly referred to as 146), wherein each MSC 125 has an associated HLR 145 and a VLR 146. Preferably, the wireless telephone system 100 includes a signal transfer point (STP) 124.

Wireless telephones 110 communicate with cell sites 111. Each cell site 111 covers a particular geographic region called a cell, including overlap between the cell sites. These cell sites 111 are located to maximize the geographic area that wireless telephone users have to access the wireless telephone system 100. Cell sites 111 may include sending capability and/or receiving capability. Each cell site 111 has a limited number of speech (i.e., data) channels available for communication and at least one control channel for sending and receiving messaging and routing commands. The wireless telephone 110 may request a speech channel from the cell site 111 by sending a message over a control channel. The cell site 111 may or may not grant the request depending on current speech channel occupancy.

After a wireless telephone 110 has been granted a speech channel, as that wireless telephone 110 moves from one cell site 111 to another cell site 111, the MSC 125 tracks that move and allows the wireless telephone 110 to maintain communications with the wireless telephone system 100.

MSCs 125 are interconnected by a plurality of trunk circuits 126. MSCs 125 are also connected to the wire line telephone system through at least one trunk circuit 151. MSCs 125 communicate with cell sites 111 through conventional data links 127. Preferably, base stations (not shown) are connected between the cell sites 111 and the MSCs 125.

Each wireless telephone 110 has one MSC 125 assigned as its home MSC 125. Each MSC 125 has an associated HLR 145 and a VLR 146. Each HLR 145 keeps data on each of the wireless telephones 110 assigned to that HLR 145. Included in the data residing in the HLR 145 is the on/off status of each wireless telephone 110 assigned to that HLR 145. An on-status means that the wireless telephone is turned on.

When a wireless telephone 110 tries to communicate with the wireless telephone system 100 through an MSC 125 that is not the user's home MSC 125, the user is still allowed access to the wireless system 100. However, in this instance, the wireless telephone 110 is considered a visiting wireless telephone 110 and is tracked and monitored by the VLR 146. The VLR 146 may report information about the visiting wireless telephone 110 to the HLR 145 assigned to that wireless telephone 110. The information typically includes the on/off status of the visiting wireless telephone 110.

Triggers may also be set in the wireless telephone system 110. Triggers may be set for each MSC 125 or for each wireless calling line number. The triggers in the wireless telephone system 110 operate similarly to the triggers in the wire line telephone system 20. For example, MSC 125 may request the HLR 145 for call processing instructions. The reply instructions from the HLR 145 may command the MSC 125 to take some special action as a result of a customized calling service or enhanced feature, for example, forwarding the call to a voice messaging system. In response, the MSC 125 may move through its call states, collect telephone keypad inputs, generate further messages, or route calls necessary to complete the command issued by the HLR 145.

Various triggers can by configured in the wireless telephone system 100. Triggers may be configured to affect either the calling party or the called party, or both. Triggers may be set on a per calling line number basis or on a per MSC 125 basis. One skilled in the art of wireless applications will understand the various triggers available in the wireless telephone system 100.

The wire line telephone system 20 may communicate data with the wireless telephone system 100 over a data link 150. The SCP 30 may be connected to an STP 124 in the wireless line telephone system 100. The data link 150 may be implemented with an SS7 protocol, as described above. In this manner, the SCP 30 of the wire line telephone system can communicate with any HLR 145 within the wireless telephone system 100. Alternatively, SCP 30 may be connected to each HLR 145 in the wireless telephone system 100 (not shown). Again, this data link 150 may be implemented with the SS7 protocol.

Wireless telephone system 100 may include an SCP 130 electrically connected to STP 124 over a data link 129. The SCP 130, which functions similar to SCP 30, may be used to provide enhanced features to the wireless telephone system 100. An SN 140 may be connected to an MSC (e.g., MSC 125b). The SN 140, which functions similar to SN 40, may be used to provide enhanced features to the wireless telephone system 100. When intelligent devices, such as SCP 130 and/or SN 140 are added to the wireless telephone system 100, it is referred to as a wireless intelligent network (WIN).

Selective Call Forwarding

The present invention is directed to systems and methods for receiving a call from a calling party at a called number, determining whether a forwarding number is associated with the called number in response to a busy or no answer signal at the called number, and forwarding the call to the forwarding number associated with the called number if the called party is a subscriber to the service. Optionally, where the forwarding number is a wireless telephone number the present invention may first determine the on/off status of the wireless telephone before dialing the forwarding number.

Figure 3:
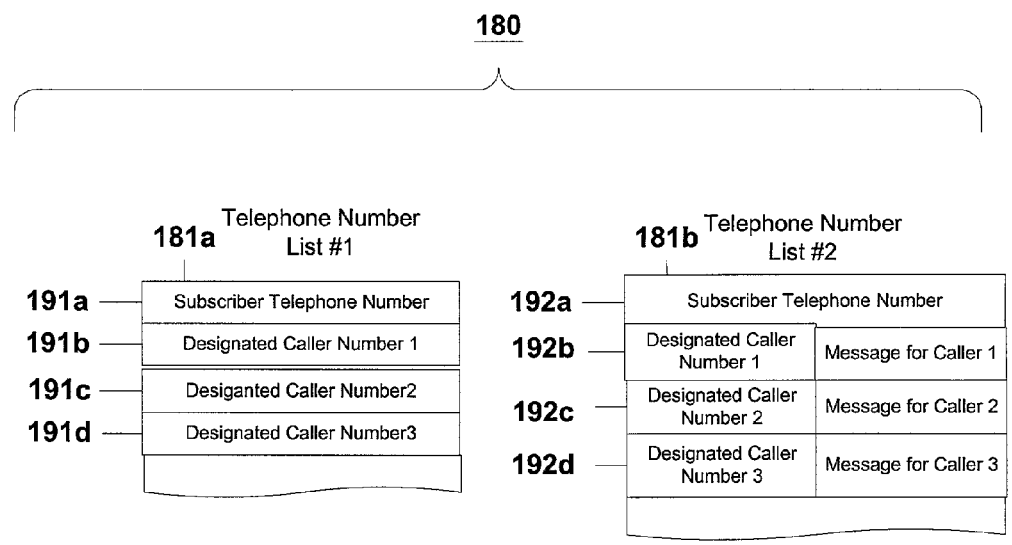
FIG. 3 is a diagram of an exemplary telephone number table in accordance with the present invention.

FIG. 3 shows a diagram of an exemplary programmable telephone number table 180. The programmable telephone number table 180 includes at least one telephone number list such as telephone number list 181a (also shown is another telephone list 181b). Each telephone number list 181a, 181b includes a subscriber telephone number, at least one preferred caller telephone number, and at least one forwarding telephone number. The forwarding and/or preferred caller telephone numbers in each list may be either wire line telephone numbers or wireless telephone numbers.

As shown in FIG. 3, exemplary telephone number list 181b includes a plurality of telephone numbers, a first telephone number 191a (subscriber telephone number), a second telephone number 191b (forwarding telephone number), a third telephone number 191c (preferred caller number 1), and a fourth telephone number 191d (preferred caller number 2). Also shown in FIG. 3 is exemplary telephone number list 181b. Exemplary list 181b also includes a plurality of telephone numbers: a first telephone number 192a (subscriber telephone number), second and third associated telephone numbers 192b (preferred caller number 1 and forwarding number for preferred caller number 1), fourth and fifth associated telephone numbers 192c (preferred caller number 2 and forwarding number for preferred caller 2), and sixth and seventh associated telephone numbers 192d (preferred caller number 3 and forwarding number for preferred caller 3). While only two or three preferred caller telephone numbers have been illustrated the number of preferred caller telephone numbers specified by a subscriber are limited only by subscriber preference and memory space provided for their storage. Preferably, the programmable telephone table 180 resides in a data storage device such as the database 31 of SCP 30.

Each subscriber has his or her own programmable telephone number storage area, in the format of a telephone number table 180 for example, and each subscriber may edit his programmable telephone number storage area. For example, a subscriber may enter a new telephone number list, delete an existing telephone number list, or modify an existing telephone number list. In modifying a telephone number list, a subscriber may add, delete, or modify a telephone number within the telephone number list. A subscriber may perform these additions, modifications, or deletions any number of ways including, by way of example only, an Internet website 50 (as shown in FIG. 1) or a telephone keypad 11. Preferably, access to the programmable telephone number table 180 is protected with a password or PIN or otherwise restricted. If the telephone number table is password protected, a subscriber will have to enter a password before the system will allow the subscriber to access the telephone number table. In the exemplary wire line telephone system 20 for example, an intelligent device (e.g., the SN 40) receives the password from the subscriber and compares the received password with a subscriber password (i.e., each subscriber has his own password) stored in a storage area. If the received password matches the subscriber password, the subscriber will receive access to the telephone number storage area. If the received password does not match the subscriber password, the subscriber will not receive access to the telephone number storage area.

The subscriber also may edit the programmable telephone number table 180 by accessing an Internet website 50. Preferably, the Internet website 50 has an application that reads a programmable telephone number table 180 from a memory or storage device (e.g., the SCP 30), or otherwise provides access to telephone number table 180. The subscriber may then edit programmable telephone number table 180 using, for example, web based tools and/or other input devices. After the subscriber has made the desired modifications, the Internet application transfers the modifications to the memory or storage device (e.g., the SCP 30) through a flow through provisioning system 51, for example, or other interface.

An SN 40 may be configured to allow a subscriber to edit the programmable telephone number table 180 through telephone keypad 11 entry or through voice recognition and processing techniques, for example. Preferably the SN 40 includes systems and methods for providing security of the programmable telephone number table 180. SN 40 may include a subscriber list. SN 40 may also include passwords and/or PINs, which desirably are entered before the subscriber may access the programmable telephone number table 180. Alternatively, the SCP 30, or another intelligent device in the AIN may include the subscriber list, the password, and/or PINs.

For example, a subscriber dials a telephone number to access the SN 40. The SN 40 prompts the subscriber for a password or PIN number. If the subscriber responds with the proper password, the subscriber is allowed to access the programmable telephone number table 180. Otherwise, the subscriber is not allowed to access the programmable telephone number table 180. If the subscriber is allowed access, the SN 40 may prompt the subscriber to review the programmable number table 180. The SN 40 may further prompt the subscriber to edit the programmable number table 180. The SN 40 may receive subscriber commands through either the telephone keypad 11 or voice recognition or processing techniques. If the SN 40 receives a command to edit the table, the SN 40 may then receive modifications to the table through, for example, telephone keypad 11 or voice recognition.

Figure 4:
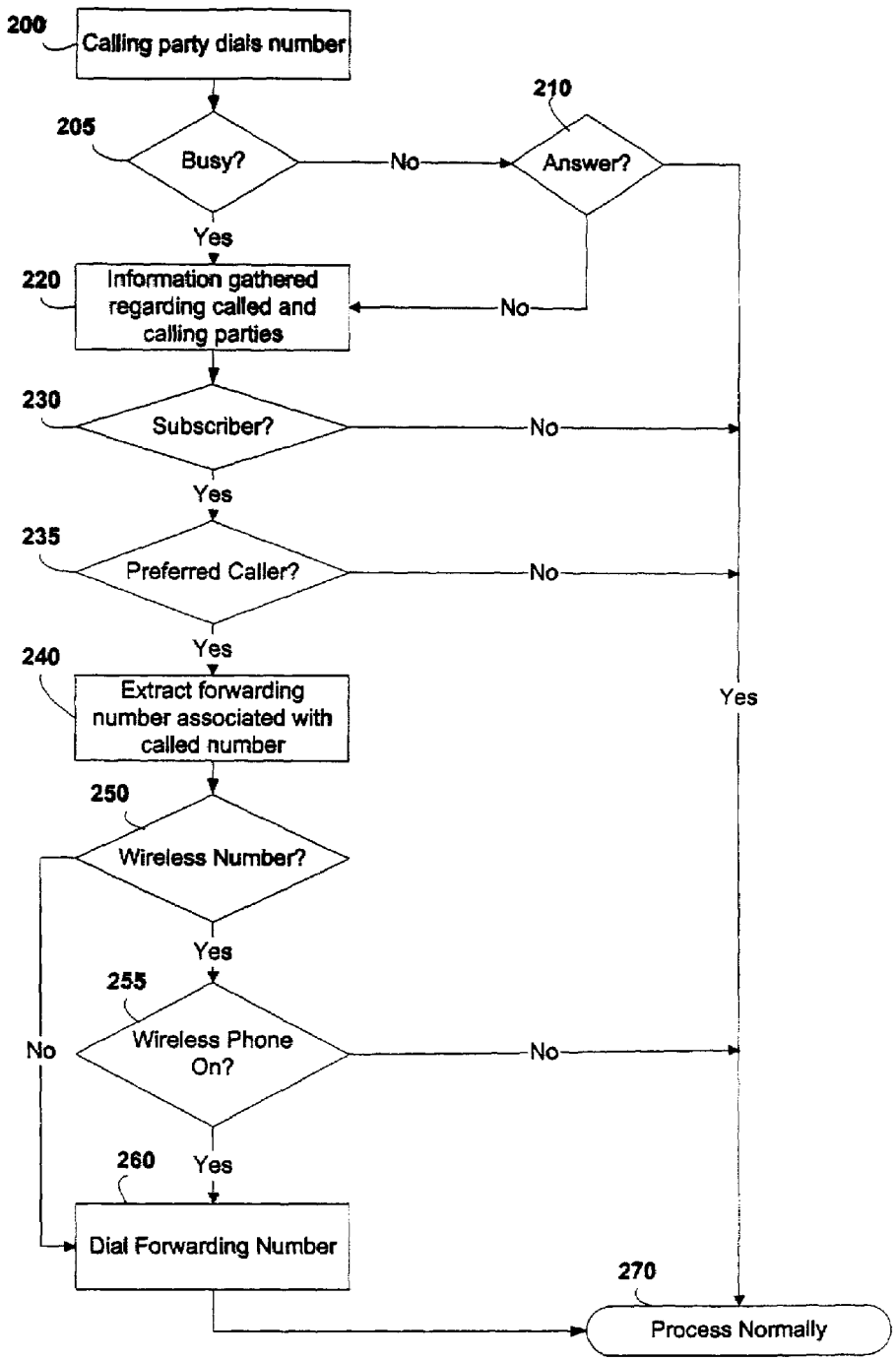
FIG. 4 is a flow diagram of an exemplary call process in accordance with the present invention.

FIG. 4 shows a flow chart of an exemplary method for selectively forwarding a call to an alternate number in accordance with the present invention where a busy signal is received or the call goes unanswered. In a preferred embodiment, the present invention is implemented on an AIN wire line telephone system 20.

At step 200*a* calling party dials the called party's telephone number (e.g., subscriber telephone number, element 192*a* or 192*b* in FIG. 3), also referred to herein as the originally dialed number. An intelligent device, for example SSP 25*a*, in the telephone system 20 receives the called party's number. At step 205 the intelligent device determines whether the called party number has a busy status. If no, the intelligent device determines in step 210 whether the call goes unanswered. If answered, the process advances to step 270 and the call is processed normally. If the intelligent device determines in step 205 that the called party number has a busy status or in step 210 that the call has gone unanswered, the exemplary system is triggered at step 220 to request/determine information regarding the calling party. In a preferred embodiment of the invention the system utilizes the T-Busy or T_No_Answer triggers in the AIN 0.2 standard, which is incorporated fully herein by reference. In such cases the SN 40 will get the necessary information from the SCP 30 and those skilled in the art will appreciate there are numerous ways of retrieving this information and updating the database at SCP 30.

At step 220, information is gathered regarding both the calling and called parties, specifically the calling and called parties' telephone numbers. In preferred embodiments of the invention an AIN trigger fires, such as a T_Busy or T_No_Answer trigger, which prompts an AIN device to request information from the AIN network. In this preferred embodiment either the T_Busy or T_No_Answer trigger fires on the local SSP 25 of the called party number and SSP 25 responds by sending the calling and called parties' telephone numbers together with other information in accordance with AIN specifications to SCP 30 in a TCAP message.

In step 230 the system determines whether the called party is a subscriber to the selective call forwarding service. As one skilled in the art will appreciate this may be accomplished in a number of ways. In a preferred embodiment of the invention though when SCP 30 receives the TCAP message from SSP 25 SPA 45 extracts the called party's telephone number and searches the initial field (e.g., fields 191*a* and 192*a*) in each of the programmable number tables 180 stored in its database 31 until a matching number is found. If a number matching the called party telephone number is found, the called party is a subscriber to the forwarding service. If no matching number is found in the initial field of the programmable number tables 180 the called party is not a subscriber to the selective call forwarding service. Where it is determined that the calling party is a subscriber processing continues at step 235. Otherwise the process advances to step 270 and the call is terminated in a conventional manner (Such as for example, providing an announcement to the calling party or forwarding the call to a voice messaging system).

In another embodiment of the invention instead of searching the initial field in each of the programmable number tables 180, SPA 45 determines whether the calling party is a subscriber by comparing the called party's telephone number to a list of telephone numbers (i.e., a subscription list) of users that subscribe to the present invention. If the called party's telephone number is in the subscription list, then the party is a subscriber. Preferably the subscription list resides in the database 31.

Having determined that the called party is a subscriber, at step 235 the exemplary system of the present invention determines if the calling party is designated as a preferred caller by the called party. In this preferred embodiment of the invention SPA 45 extracts the calling party's telephone number from the TCAP message and compares it to the preferred caller telephone numbers (e.g., 192*c*, 192*d*) listed in the called party's programmable number table 180. If the calling party's number does not match any of the preferred caller telephone numbers in the called party's programmable number table the process advances to step 270 and the call is processed normally. If the calling party's number does match one of the preferred caller telephone numbers in the called party's programmable number table the process advances to step 240.

In step 240 the system extracts the called party's forwarding telephone number (e.g., 191*b*, 192*b*) from the called party's programmable number table. In step 250 the system determines whether the called party's forwarding number is a wireless telephone number. If the called party's forwarding number is not a wireless number the system communicates the called party's forwarding number to the intelligent device and the process advances to step 260. In this preferred embodiment of the invention SPA 45 sends a TCAP response to SSP 25 containing the called party's forwarding telephone number and instructions for the SSP 25 to connect the call to the forwarding number. If the system determines in step 250 that the forwarding number is a wireless number, in step 255 the system may contact the wireless telephone system and determine whether the device corresponding to the wireless number has an on or off status. In this preferred embodiment of the invention SPA 45 queries HLR 145 of wireless telephone system 100 to determine this information via STP 124. Alternatively, if the wireless telephone system 100 does not employ an STP 124 SPA 45 queries HLR 145 directly. Such a configuration would utilize a data link (not shown) between the SCP 30 and HLR 145 in the wireless telephone system 100. If the system determines that the wireless device has an off status the process advances to step 270 and the call is processed normally. If the system determines that the wireless device has an on status, the system communicates the called party's forwarding number to the intelligent device with instructions to connect the call to the forwarding number.

In step 260 the SSP 25 forwards the call to a forwarding telephone number and advances to step 270 where the call is processed normally from that point on. Preferably, the SCP 30 may command the SSP 25 to provide the calling party with an indication that the called party's forwarding telephone number is being called by audible voice notification. Alternatively, the indication may be through audible tones, or through other indicators such as a lamp.

In an alternate embodiment of the invention the called party line is a wireless telephone 110. Preferably, in this embodiment the wireless telephone system 100 is a wireless intelligent network (WIN). In this embodiment, the proper triggers are configured in the wireless telephone system 100 so that the embodiment operates similar to the above described embodiments originating in the wire line telephone system 20. In this embodiment, the SCP 130 and the SN 140 in the wireless telephone system 100 are adapted analogously to the SCP 30 and the SN 40 in the wire line telephone system 20.

It should be noted in all cases however that the implementation of the present invention is not limited to AIN-based networks, and other advanced or intelligent networks and arrangements may be used to implement the invention.

The invention may be embodied in the form of appropriate computer software or in the form of appropriate hardware or a combination of appropriate hardware and software without departing from the spirit and scope of the present invention. Further details regarding such hardware and/or software will be apparent to one skilled in the art. Accordingly, further descriptions of such hardware and/or software herein are not provided.

It is noted that the foregoing examples have been provided merely for the purpose of explanation and are in no way to be construed as limiting the present invention. While the invention has been described with reference to preferred embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A system for processing a telephone call, the system comprising:
    a wire line telephone system including:
        means for receiving a called number from a calling party number,
        means for dialing said called number,
        means for determining whether a personalized message associated with said called number is intended for said calling party number in response to a busy or no answer signal on said called number,
        means for delivering said personalized message to said calling party number,
        a service switching point connected to a plurality of subscriber locations, each of said subscriber locations including a respective wire line telephone,
        a first signal transfer point including means for communicating with said service switching point,
        a service control point including means for communicating with said first signal transfer point, said service control point containing a database, and
        a service node connected to said service switching point through a data link, and connected to the service control point through a second data link,
        said service control point including means for commanding said service switching point to forward said calling party number to said service node for delivery of said personalized message, wherein said service node includes means for providing an indication that said service control point has commanded said service switching point to forward said calling party number to said service node for delivery of said personalized message.

2. The system of claim 1, wherein said service control point includes means for performing said determining whether a personalized message associated with said called number is intended for said calling party.

3. The system of claim 1, wherein said service node includes means for providing a prompt before said service control point commands said service switching point to forward said calling party number to said service node for delivery of said personalized message.

4. The system of claim 1, wherein said database includes a subscription list.

5. The system of claim 1, wherein said database of said service control point comprises a programmable telephone number table that includes a first telephone number and at least one next telephone number.

6. The system of claim 5, wherein said service node includes means for allowing modification of said programmable telephone number table.

7. The system of claim 5, wherein said service node includes means for allowing modification of said personalized message.

8. The system of claim 6 or 7, wherein said service node includes means for allowing said modifications using one of telephone keypad commands and an Internet website.

9. The system of claim 1, wherein said wire line telephone system comprises an Internet website and a flow-through provisioning system, and wherein the means for delivering said personalized message further comprises means for retrieving said message from the internet website and means for playing said message on said calling party number.

* * * * *